United States Patent [19]
Jarecki et al.

[11] Patent Number: 5,999,919
[45] Date of Patent: Dec. 7, 1999

[54] EFFICIENT MICROPAYMENT SYSTEM

[75] Inventors: Stanislaw Jarecki, Cambridge, Mass.; Andrew M. Odlyzko, Berkeley Heights, N.J.

[73] Assignee: AT&T, New York, N.Y.

[21] Appl. No.: 08/805,522

[22] Filed: Feb. 26, 1997

[51] Int. Cl.$^6$ .................................................. G06F 17/60
[52] U.S. Cl. .................. 705/40; 705/38; 705/39
[58] Field of Search .................. 705/8, 40, 38, 705/39; 380/24; 455/4.2; 235/380; G07F 7/10

[56] References Cited

U.S. PATENT DOCUMENTS

| | | | |
|---|---|---|---|
| 5,392,353 | 2/1995 | Morales ..................................... | 380/20 |
| 5,621,201 | 4/1997 | Langhans et al. ...................... | 235/380 |
| 5,679,940 | 10/1997 | Templeton et al. ..................... | 235/380 |
| 5,696,908 | 12/1997 | Muehlberger et al. ................. | 395/239 |
| 5,754,939 | 5/1998 | Herz et al. .............................. | 455/4.2 |
| 5,768,385 | 6/1998 | Simon ...................................... | 380/24 |

FOREIGN PATENT DOCUMENTS

| | | | |
|---|---|---|---|
| 0772165 | 5/1997 | European Pat. Off. .......... | G07F 7/10 |

OTHER PUBLICATIONS

R. Anderson et al., "Netcard—a practical electronic cash system", *Fourth Cambridge Workshop on Security Protocols*, Springer Verlag, Apr. 1996.
M. Bellare et al., "iKP—a family of secure electronic payment protocols", *First USENIX Workshop on Electronic Commerce*, New York 1995.
S. Glassman et al., "The millicent protocol for inexpensive electronic commerce", *Proc. 4$^{th}$ International World Wide Web Conference*, 1995.
E. Gabber et al., "Agora: A minimal distributed protocol for electronic commerce", *Second USENIX Workshop on Electronic Commerce*, pp. 223–232, Oakland, CA., Nov. 1996.
R. Hauser et al., "Micro–payments based on ikp", *14$^{th}$ World–Wide Congress on Computer and Communications Security Protection*, Jun. 1996.
C. Jutla et al., "Paytree: 'amortized signature' for flexible micropayments", *Second USENIX Workshop on Electronic Commerce*, Nov. 1996.
C. Neuman et al., "Requirements for network payment: the netcheque perspective", *Proc. of IEEE COMPCON*, Mar. 1995.
T. Pedersen, "Electronic payments of small amounts", *Fourth Cambridge Workshop on Security Protocols*, Springer Verlag Apr. 1996.
R. Rivest et al., "Payword and micromint: Two simple micropayment schemes", *Fourth Cambridge Workshop on Security Protocols*, Springer Verlag Apr. 1996.
Y. Yacobi, "On the continuum between on–line and off–line e–cash systems", R. Hirschfeld, editor, *Financial Cryptography*, Anguilla, West Indies, Feb. 1997, Springer Verlag.

*Primary Examiner*—Allen R. MacDonald
*Assistant Examiner*—M. Irshadullah
*Attorney, Agent, or Firm*—Karin L. Williams; William Ryan

[57] ABSTRACT

Existing software proposals for electronic payments can be divided into "on-line" schemes which require participation of a trusted party (the bank) in every transaction and are secure against overspending, and "off-line" schemes which do not require a third party and guarantee only that overspending is detected when vendors submit their transaction records to the bank (usually at the end of the day). A new "hybrid" scheme is proposed which combines the advantages of both "on-line" and "off-line" electronic payment schemes. It allows for control of overspending at a cost of only a modest increase in communication compared to the off-line schemes. The protocol is based on probabilistic polling. During each transaction, with some small probability, the vendor forwards information about this transaction to the bank. This enables the bank to maintain an accurate approximation of a customer's spending. The frequency of polling messages is related to the monetary value of transactions and the amount of overspending the bank is willing to risk. For transactions of high monetary value, the cost of polling approaches that of the on-line schemes, but for micropayments, the cost of polling is a small increase over the traffic incurred by the off-line schemes.

20 Claims, 1 Drawing Sheet

*FIG. 1*

EFFICIENT MICROPAYMENT SYSTEM

FIELD OF THE INVENTION

This invention relates to electronic commerce and, more particularly, relates to a system for control of overspending based on polling.

BACKGROUND OF THE INVENTION

Typically, inexpensive items such as newspapers or candy bars are paid for in cash, since the costs of other payment systems, such as checks or credit cards, are too high for such small transactions. Electronic commerce is expected to lead to a dramatic growth in even smaller transactions, in some cases, transactions for less than a penny, such as purchases of individual news stories.

Most of the conventional electronic payment systems are inadequate for handling "micropayments" because of either computational or communications burdens. Therefore, a number of electronic micropayment systems have recently been developed (a list of references included in the Section 1, below provides citations to various conventional systems). While these systems do not provide all of the features of conventional electronic payment schemes, they are more efficient and provide adequate features for the small sums involved in micropayments.

The main problem for issuers of digital money is preventing "double spending" of legitimate digital currency. Although it is possible to verify who created a particular document, a basic problem with all electronic payment systems is that bits are easy to copy.

One class of electronic payment systems rely on tamper-resistant devices which prevent double spending by keeping users from duplicating those devices or from modifying the software in them. The disadvantage of these systems is that they require special hardware, and if the chips are reverse-engineered, the issuers could face a disastrous loss.

A second class of systems, on-line software-only electronic payment systems, can be secure if they are "fully" on-line such that the issuer participates in each transaction (such as in the iKP or NetCheque systems). However, these systems are typically unacceptable in micropayment situations, since the computational and communication requirements that they impose are excessive when a purchase costs only a fraction of a penny.

A third class of systems, off-line digital certificate systems, applicable to micropayment schemes, have been proposed to reduce the computational and communication requirements described above (e.g., NetCard, PayTree, PayWord, etc.). In each of these systems however, in order to make purchases from vendors, a customer must receive a digital certificate from a bank or some other financial intermediary. Each of these systems therefore either expose the issuer of the certificate to large losses, or, limit the users flexibility. The issuer is exposed to losses when the user spends up to a total limit assigned to that user at each of, for example, 10,000 vendors. While such losses can be prevented if the customer is required to obtain a separate certificate for each vendor she intends to deal with, these certificates must then sum up to no more than the customer's bank account balance. Similarly, the system may prevent overspending by "freezing" in the customer's account the maximal amount that the customer can spend with a given vendor. However, both of these solutions would be unacceptably restrictive when a customer wants to deal with any of thousands of online vendors and can not know beforehand how much she might spend with each vendor.

Accordingly, it is submitted that each of the above-outlined conventional approaches of tamper-resistant devices, fully on-line payment systems and off-line digital certificate systems is inadequate in low-priced transactions via electronic commerce.

SUMMARY OF THE INVENTION

The present invention is directed to a micropayment system in which a single certificate allows a customer to deal with all vendors in the system, and the possibility of overspending is radically reduced by the mechanism of polling of customers' purchases.

In a first embodiment, the system incorporates probabilistic polling of a customer's transactions. The first transaction between a customer and a vendor is always registered with the bank, but for each consecutive transaction, the vendor uses a random number to determine whether to report that transaction to the bank. The probability of reporting each transaction is dependent upon a number of factors including the size of the transaction, and is selected so as to minimize the number of messages reported. The proportion constant may depend upon the customers credit (or deposit) in the bank, and the bank's trade-off between communication costs of the system and the (always small) amount of overspending it can tolerate. This constant is adjusted to produce (with high probability) an accurate estimate of the customer's total spending. When that estimate reaches a certain limit, the bank sends messages to all the vendors dealing with that customer to stop any further sales to that customer.

In a second embodiment, rather than requiring a vendor to register with the bank the first payment of each customer that contacts him so that the bank can maintain a list of vendors for each and every customer, the vendors are required to maintain a list of suspected "overspenders". Accordingly, rather than alerting only the vendors on a particular customer's list of potential overspending, the bank simply "broadcasts" an alert message to all of the vendors in the system. The vendor is then responsible for checking if a customer is on the list of suspected overspenders, thereby reducing the time necessary to register the first transaction with a customer and wait for a response from the bank.

Finally in a third embodiment, the system uses deterministic polling of a customer's transactions. In this case, the polling decisions of a vendor are made such that the polling messages contain an exact dollar amount that the user has spent since the last, or previous poll. Therefore, the bank updates the estimate of the customer's spending upon receipt of each report from each vendor.

DETAILED DESCRIPTION

Section 1

In the first embodiment of the invention, the use of probabilistic polling in a micropayment system creates an electronic payment scheme that is a "hybrid" between the conventional on-line and off-line electronic payment schemes. In this scheme, the expected amount of polling messages triggered by a customer who spends all of his or her credit limit is a small constant (typically between 5 and 10) and is independent of the pattern of the customer's spending (i.e., whether the customer makes a few big transactions or many small ones, and whether she makes the transactions with all different vendors or with just one vendor). This implies in particular that for large purchases (i.e., each on the order of one fifth of the customer's credit limit) this scheme generates approximately one message per purchase (approaching the cost of a fully on-line electronic credit-card payment system), while for micropayments, the amount of overhead incurred by a single transaction becomes negligible (approaching the cost of a fully off-line system).

This system supports a variety of policies, depending on the desired trade-off between the communication overhead of the scheme and the amount of overspending a bank is willing to risk. The maximum overall expected amount of overspending of a single dishonest customer is proportional to the amount of credit given to that customer. This proportion constant must be larger than 1, and the closer it is to 1 the larger the communication cost of the scheme. However, the expected losses due to overspending can be eliminated almost entirely if, in exchange for a certificate, the bank requires an extra security deposit in addition to the value of the electronic cash a user can spend with that certificate. For example, if a customer needed $70 of electronic cash, she could go to the bank, deposit $100 into an account, and be allowed to spend her cash with any vendors, subject to the constraint that her total spending during the day should not exceed $70 (any unspent money would be refunded to the customer the next day).

This scheme provides several desirable features which are typically provided only by using cash. For the users, there is some anonymity given that the bank does not need to "know" the customer in order to accept his cash and open an account (a user can pay the bank with anonymous electronic cash; the bank has no knowledge of the user, other than the identity of the vendors from whom the user makes purchases). The vendors learn only the customers' names, as specified by the certificate from the bank. Accordingly, even if a customer chooses to present himself as a "new" purchaser later in the day, the vendor has no way of determining that it is, in fact, a previous customer. In addition, the bank has no information as to what the customers are buying from the vendors (the bank does however know which vendors the customers deal with, and how much the customers spend with each of the vendors). When the customer is required to make a deposit prior to any transaction, there is the added advantage for the bank that, just as with cash, the customer cannot refuse to pay on the grounds that the vendor sold defective goods.

This probabilistic polling "method" or "system" can be added to any off-line, single-certificate micropayment scheme, such as PayWord, NetCard, PayTree, etc . . .

I. User Initialization/First Payment in Conventional Payment Schemes

All the above-noted conventional payment schemes share the same basic structure, i.e., all vendors V and customers (hereinafter "users" U) know the public key $PK_B$ of the bank B, and each user U has a certificate $C_U$ which contains the following data:

$$C_U = \{B, U, A_U, PK_U, Exp, Max\}_B$$

where B is the bank issuing the certificate, $A_U$ is the user's address, $PK_U$ is the user U's public key, Exp is the expiration date of this certificate, and Max is the maximum amount that U is allowed to spend with any vendor.

In each of the conventional schemes noted above, the first payment of user U to a vendor V is more complex than the consecutive payments, i.e., the first payment may be labeled "registration with a vendor". In each of the schemes, this message conforms to the following pattern:

$$Reg_{UV} = \{C_U, V, T, P^{(1)}\}_U$$

where T is the time of the purchase and P is a specific payment field, different for every scheme (for example, in PayWord, NetCard and in Pedersen's scheme, $P^{(1)}$ contains a unit worth, in dollars, of future payments from U to V, and a value $x_n = h^n(x_0)$ which is a result of n applications of publicly known hash function h to a random value $x_0$ while in PayTree, $P^{(1)}$ contains a root of a tree of hash applications to random leaf values). Applicants note that future payment schemes might determine $P^{(1)}$ in yet other ways. Upon receipt of $Reg_{UV}$, V checks B's signature on $C_U$, extracts $PK_U$ from $C_U$, verifies U's signature on $Reg_{UV}$, and accepts the first payment [Pay] if it is verified.

If the first payment proceeds as expected, vendor V will accept consecutive payments $P^{(1)}$ from user U during that day, until the maximum spending value Max is reached. At the end of the day, vendor V submits to the bank B each of the payments of user U and the bank B reimburses vendor V after checking that the payments are valid.

Unfortunately, in each of the conventional systems, if a user U is dishonest and spent more than her available credit, the bank B can only partially reimburse the vendors V. The overspending of user U is potentially limited only by the number of vendors V in the system and the maximum spending value Max in the certificate $C_U$. Therefore, if there are many vendors in the system, the average loss caused by a dishonest user U per vendor V can be approximately $Max_U$.

II. Adding a Probabilistic Polling Method to Control Overspending

To control overspending, the following probabilistic polling method may be added to the underlying conventional schemes described above.

A. Bank/User Initialization

First, the bank B determines, based on a desired trade-off between the level of security and the computational complexity of the polling mechanism, the expected number of polling messages triggered by a user who spends up to her credit limit and the number of polling messages which will cause the bank to suspect that a user is overspending.

For example, the bank B picks constants, for example c and M, where c is the expected number of polling messages triggered by a user who spends up to her credit limit, and M is the number of polling messages which will cause the bank to suspect that this user is overspending her credit limit. These constants can be different for different customers, depending on how much money those customers have on deposit, or what the customer's past credit record indicates (typical values for c may be between 2 and 10, and for M between 5 and 30). For every user U, the bank stores the following information:

$$I = \{m, x, L\}$$

where m is the dollar amount that B allows that user U to spend (note that although this example is described as "credit based", the bank may also require a deposit from each customer or user), x is the counter of polling messages, initially zero, and L is a list of vendors, initially empty, that could be involved in transactions with that user. When user U buys m amount of electronic coins, B computes f=c/m and provides U with a modified certificate:

$$C_U = \{B, U, A_U, PK_U, Exp, f\}_B$$

A slight variation on this user initialization step is noted as follows. As noted above, in conventional payment schemes, public key encryption is utilized for security purposes. However, assuming that every user-to-vendor registration is forwarded to the bank, and every vendor has a policy of waiting for the bank's acknowledgment before continuing with sales to the user, the signature of the user on the $Reg_{UV}$ message can also be computed with a symmetric key (for example, a DES or RC5 key) that is shared by the bank and the user. The vendor could not check the authenticity of such a registration message, but would forward it to the bank that would then check the signature on Reg (i.e., the user's "registration with the vendor") and reply with acknowledgment or denial to the vendor, also signed with a symmetric encryption scheme using a shared vendor-bank key.

Applicants note that this change would necessitate increased trust in the bank, as the bank could now defraud the users. The users would then be at risk for the amounts they deposit in the bank. This change would also make it much riskier for vendors to proceed with the sales to customers without waiting for the bank's acknowledgment, as they would be unable even to check user's credentials and identity without waiting for the bank's response. However, if the vendors were to adopt the policy of always waiting for the bank's acknowledgment anyway, using symmetric encryption for authentication would dramatically decrease the processing time of all parties.

B. First Payment: Registration with a Vendor

Applicants note that while the payment protocol between U and V is the same as in the underlying scheme, the behavior of the vendor is modified as follows—upon receipt of $Reg_{UV}$, V checks whether $u_{UV}*f_U \leq 1$, where $u_{UV}$ is the worth in dollars of the payment. If $u_{UV}*f_U>1$, the vendor should not accept U's payment (alternatively, the vendor may chose to treat U's payments as a "bundle" of several separate payments, each having a value of less than $1/f_U$). Otherwise, V forwards $Reg_{UV}$ to B. When B receives the registration, it checks the signatures on it, adds V to the list $L_U$, and replies to V with an acknowledgment if $x_U<M$, or a rejection if $x_U \geq M$ (note that the replies should contain some hashes of the message Reg that triggered them, and for increased security these replies can be signed by the bank).

Since registration of U with vendor V occurs at the time of first payment, V decides then whether to report this first payment to the bank. When V receives an acknowledgment from B, V can begin selling goods to U (note that although V can actually start selling goods to U immediately, V will bear the risk that if the bank B later forwards a rejection, V will not be reimbursed for the sales to U). Each vendor can formulate a separate policy in this regard, based on the amount of fraud encountered thus far, and the average delays the vendor is experiencing while waiting for the bank's acknowledgment.

C. Subsequent Payments and Probabilistic Polling

According to the first embodiment of the invention, for every payment V receives, she casts a random coin, and with a certain probability, based partially on the dollar worth of the payment, V sends a message with U's name to B. For example, at every payment V receives from U, V "casts a random coin", and, with probability $p=u*f_U(=u/m_U*c)$, V sends a message with U's name to B.

Figure 1:
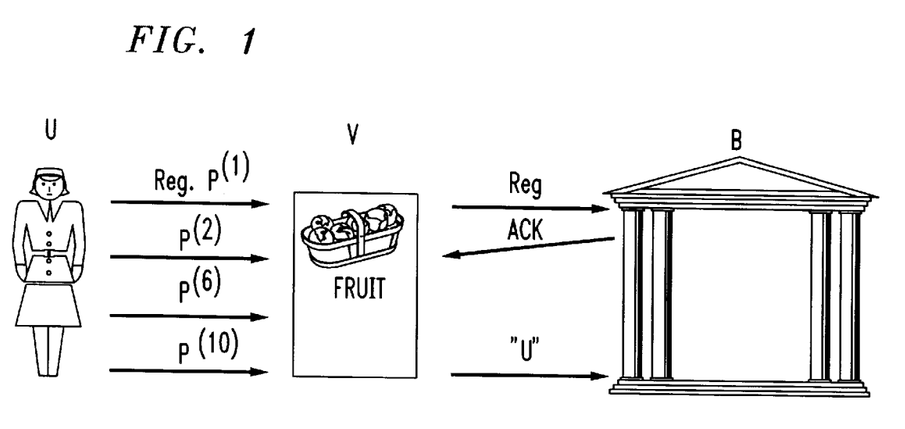
FIG. 1 presents an illustrative example of a payment session in a micropayment system incorporating a probabilistic polling method in accordance with the invention.

FIG. 1 shows an illustration of an example of a payment session in a system incorporating a probabilistic polling system in accordance with the invention. The user U sends his registration Reg(which includes a first payment $P^{(1)}$) to the vendor V, who relays U's registration Reg to the bank. The user U then proceeds to make an additional nine payments, $P^{(2)}$ to $P^{(10)}$. In this sample illustration, the random number generator determines that only the sixth payment, $P^{(6)}$, triggers a polling message (illustrated as "U") from V to B, about U's payment.

The first payment $P^{(1)}$, which is contained in the registration message $Reg_{UV}$, can also trigger a polling message from V to B (and if so, that polling message should be "piggybacked" with the forwarding of the $Reg_{UV}$ from V to B). Note that even then, V has a choice of waiting for B's reply prior to the transmission of the goods to U.

Every time the bank B receives a report from a vendor V about user U, bank B increments the $x_U$ counter by one unit. When $x_U$ reaches M, the bank B broadcasts an alert message to all vendors V on the $L_U$ list. When a vendor V receives an alert message, vendor V may terminate its dealings with user U, and, if vendor V has actually sold anything to user U on that day (V may in fact have only received registration $Reg_{UV}$ from U), vendor V sends to bank B all of the payments vendor V received from user U on that day (note that this is the same kind of message that vendor V would typically send at the end of the day to get reimbursed for user U's purchases).

Attached hereto is Sections 2, 3, and 4 which provides a detailed performance analysis of the micropayment scheme described herein. In particular, Section 2,3, and 4 include a section presenting the relations between system parameters, the average expected loss by thieves, the volume of communication and delays added by polling and guidelines for setting up a probabilistic polling system. In addition, Section 3 sets out the computations for performance analysis and Section 4 provides various tables with the data of the analysis for the increase in communication volume.

D. Eliminating a Need for Registration Upon Receipt of First Payment

In the first embodiment of the system described in detail above, the vendor is required to register with the bank upon receipt of a first payment from every user that contacted him, thereby allowing the bank to maintain a list $L_U$ of all vendors a user U may be dealing with. If the polling messages about user U reached a threshold M, the bank sent an "alert" messages to all vendors on list $L_U$.

Alternatively, Applicants note that in a second embodiment of the invention, the system can require that the bank broadcast the alert messages to all the vendors in the system. The vendors would then be required to keep "hotlists" of suspected users, and rather than registering the first payment of a new user U with the bank, B, the vendor V verifies whether a user is on their hotlist.

Applicants note that while this modification will greatly increase the time required for the bank to broadcast all of the alerts, and therefore will also create a much larger delay for an interested vendor to receive an alert to stop dealing with a suspected user, the vendors will also no longer be required to forward the registrations from the users, and the bank will not have to process the registrations and respond with acknowledgment or denial messages.

III. Adding a Deterministic Polling Method to Control Overspending

As noted earlier, a third embodiment of the invention modifies the first by, rather than deciding whether to report a payment by casting a "random coin", the polling decisions of a vendor can be made deterministically in the following way. The i-th payment of user U to vendor V triggers V to send the polling message to the bank if and only if i=[k$^j$] for some integer j In addition, the polling message could contain the exact dollar amount the user has spent since the last poll. If each payment represents u amount of money, then at the i-th payment, if i=[k$^j$] for some integer j, the vendor would notify the bank that the user spent (i-i$_{previous}$)*u, where i$_{previous}$ is the payment number that originated the previous polling message (of course, for i=1, i$_{previous}$=0). Similarly, the bank's counter x$_U$ represents not the number of the polling messages received, but the sum of money reported by vendors about the user U.

For example, if k=2, the vendor will report the first, second, fourth, eight, and so on, payments of each user. When the bank receives these reports, it updates the estimates of the user's spending to u, 2u, 4u, 8u, and so on. Clearly, at every point, the bank's counter x$_U$ will be at least 1/k of the amount the user spent with all the vendors. The bank sends out an alert if x$_U$ reaches k*m. If the bank requires m' of deposit and gives m credit to the user, the expected loss due to a single thief is exactly the same as in the case of the original proposal, i.e. km−m'+E. However, the amount of traffic is quite different.

In the third embodiment incorporating the deterministic system, the number of polls about a user depends on the number of payments she makes to the same vendor. In the first embodiment, the expected number of polls originated by an honest user who spends all her money is always a constant (denoted by c). This means that if the user makes small purchases with many vendors, the deterministic system is likely to produce higher traffic. On other hand, if the user makes purchases of value u with only one vendor, then in the deterministic algorithm, the vendor will produce log$_k$ m/u polls. This number will be smaller than c if u/m>1/k$^c$.

IV. Discussion

The "hybrid" schemes discussed above clearly combine the advantages of both on-line and off-line electronic commerce strategies. It allows for control of overspending at a cost of only a modest increase in communication compared to the off-line schemes.

By incorporating probabilistic polling, during each transaction with some small probability, the vendor forwards information about the transaction to the bank, enabling the bank to maintain an accurate approximation of a customer's spending. The frequency of polling messages may be related to the monetary value of transactions, the amount of overspending the bank is willing to risk, and any other factors determined by the bank. For transactions of high monetary value, the cost of polling approaches that of the on-line schemes, but for micropayments, the cost is merely a small increase over the traffic incurred by the off-line schemes.

Alternatively, the polling decisions of a vendor can be made deterministically, for example, by transmitting a polling message to a bank only if i=[k$^j$] for some integer j. The polling message could contain the exact dollar amount a user has spent since the last poll, thereby enabling the bank to maintain a record of the sum of money reported by vendors for each user.

Section 2—Performance Analysis of Micropayment Scheme

In evaluating the performance of the micropayment scheme based on the probabilistic polling mechanism, we are interested in the following measures:

1. The average (expected) amount that a thief can spend without having money on deposit to pay for it. An important factor here is the ratio between the expected amount of purchases of a single user which triggers the bank to send alert messages, and the credit M given to that user. We will denote that ratio by k.

2. The volume of additional communication and computation.

3. The delays that are slowing down the micropayment protocol. One kind of delay experienced by an honest user will be a halt in her transactions caused by the bank which unnecessarily sends out alert messages about that user, even though the user has not overspent her credit. We will denote the probability of such event by d. We can tune our system so that this probability is a small number, like 0.03 or 0.001, but it cannot be ignored.

In Section 2.1 we will present the relations between values k, c, M and d, which are the parameters that define the performance of our system. In Section 2.2 we discuss the money losses due to thieves. In Section 2.3 we analyze the volume of the communication introduced by the system. In Section 2.4 we examine the delays introduced by the polling mechanism. Finally in Section 2.5 we give a procedure for setting up the system parameters so that the probabilistic polling micropayment scheme performs at an optimal cost under given conditions.

2.1 Relations between System Parameters

Since every user who overspends (even by 1 cent) is caught at the end of the day, we assume that if somebody decides to steal, they will try to steal as much as possible until the bank broadcasts the alert messages. In that case, we can ask for the expected amount of over-the-limit purchases of a thief U at the point where x$_U$=M. Below, we show that k, the ratio between the expected amount a thief has spent which triggered an alert (i.e. the expected amount a user must spend to generate M polling messages) and the amount of his credit m in the bank is k=M/c, which leads to the following relation between the parameters:

$$M = c * k \qquad (1)$$

The parameters d, M and c satisfy the following inequality, also computed in section A (below):

$$d \leq 0.8 \frac{c^M e^{M-c-1}}{\sqrt{2\pi}(M-c-1)(M-1)^{M-\frac{1}{2}}} \qquad (2)$$

The constant 0.8 in this equation comes from an inspection of the "goodness" of our approximation for the range of values that would make sense in our system, i.e. 1.3≤k≤5, 0.001≤d≤0.1. The ranges of c and M that correspond to these values of d and M are approximately 5≤c≤100, 3≤M≤50.

Notation

In the cost analysis below we will consider the following quantities given by external circumstances:

U—the number of customers using the system

V—the number of available vendors

N—the average number of purchases per user per day

W—the average number of vendors a single user makes purchases from in a day t*U—the number of thieves (i.e. overspending users) encountered by the system in one day.

We will assume that the number of thieves is a small proportion $t \approx 10^{-2}$) of all customers.

We should also recollect the variables that we, the system designers, have a control over:

m—the credit given to a customer.

m'—(optional) the deposit required of a customer c—the expected number of polling messages originated by a user who spends all his credit m $x_U$=bank's counter of the polls about user U M—the threshold s.t. if $x_U$=M, the bank sends alert messages about user U k—a number s.t. km is the expected value of purchases which will originate M polling messages, i.e. the expected amount of purchases which will trigger the bank to send alert messages about the user.

d—probability that an honest user who spends up to m of electronic cash, will still cause M polls, and hence trigger the bank to send alert messages.

2.2 Average Expected Loss Caused by Thieves

In all off-line and single-certificate cash schemes, every thief can spend up to his maximum credit with each vendor. Hence the total losses of these schemes due to a single thief are bounded only by V*m, where m is the average credit (or deposit) of a thief.

Thanks to the polling mechanism, potential losses can be greatly reduced. The expected amount a single thief can overspend can be expressed as (k−1)*m+E, where E is the value of goods a thief U can purchase during the time that passes between the moment when some vendor originated the polling message which caused bank's monitoring variable $x_U$ to reach the threshold value M, and the time the alert message reached all vendors that U tried to buy something from (they all must be on the Lo list of the bank). If we require a deposit m' from each user, the expected loss due to a single thief becomes $$\text{financial loss per one thief} = km - m' + E \qquad (3)$$

We can minimize this number if we set m'/m=k+E/m, but that could make m'/m too big, specially for small M. However, if we simply set m'/m=k, then the average loss due to a single thief would be E Hence the total loss caused by a thief in our scheme could be equal to the amount one can buy during a delay between two messages flowing across the network (the last poll that triggered the alert going from some vendor to the bank and the alert message going the other way), while in the off-line, single-certificate schemes (like PayWord), this cost is equal to the amount one can buy doing a whole Jay. Obviously, this is a dramatic reduction.

Consider the delay between the moment when some vendor sends the poll that trigger the bank to broadcast the alert messages, and the moment when this alert actually reaches all the vendors that might be dealing with the over spending user. This delay will be on the order of the delay experienced by a vendor in waiting for a single acknowledgment, unless the number of vendors on the $L_U$ list is exceptionally high. However, because users cannot register with vendors without making purchases, the thief can try to make the $L_U$ list long only if he finds many vendors who are selling very cheap products and makes single purchases from them. It is not clear that the thief can buy any time for himself in this way.

2.3 Volume of Communication Added by Polling

The volume of the additional communication caused by our polling system in a day can be counted as follows:

polling messages+registrations forwarded by vendors+acknowledgments from banks to vendors+messages in alerts caused by thieves+messages in alerts caused by honest users+polling messages caused by thieves=$cU+(1-c/N)UW+UW+2tUW+3dUW+tUM$ Hence, the volume of the additional traffic per one user is:

$$\text{volume of traffic per user} = (c+tM)+W*(2+3d+2t-c/N). \qquad (4)$$

We refer the reader to Section 3 below for better understanding of the mathematics of this system. We note that from the number of registrations forwarded by the vendors (which is equal to UW), we excluded the c/N fraction of registration messages which carry a polling message piggybacked on them, since such messages are counted in the cU expression for the number of polling messages. In the above equation, we assume that every user spends every day all the coins she purchased (hence c is the expected number of polling messages caused by a single user). Also, we ignore the negligible possibility that an honest user can cause alerts twice on the same day. In the computations below we will fix t to be 0.01, but we note that the value of t in the range between 0 and 0.1 has a minimal influence on the results.

We will examine the cost function above for different values of W and N and for k=1.5 and k=3. It turns out that if we take M for which the cost function is minimized, values of d can be larger then the 0.01 that we assume in the computations below. Therefore, we will always compute two values of this cost function: one for Mmin which gives minimal cost, and the other for the smallest M for which d is smaller then 0.01. The latter is a minimal communication cost subject to the constraint that $d \leq 0.01$. These values are included for reference in Table 2. Also for reference, we show in Table 3 the values of Mmin and d corresponding to the minimal costs shown in Table 2, and in Table 4 we give values of $M_{d=0.01}$, i.e. the smallest M s.t. $d \leq 0.01$, for different k's.

Table 1 shows the relative increase in the communication costs of adding the polling mechanism to PayWord. The communication cost of PayWord itself is 2N messages per user per day (we count the messages carrying the purchased goods from the vendor to the user). For comparison, the communication cost (per user) of a fully on-line scheme like iKP is 4N, because if the bank participates in every transaction, there is 100% increase in traffic. In FIG. I we give a range from-to of the increase in communication costs, wherefrom corresponds to the minimal cost for $M=M_{min}$, and to corresponds to the cost for $M=M_{d=0.1}$. Table 1 simply shows the proportion between the added cost of the polling mechanisms and the communication cost of PayWord itself, i.e. 2*N. The volume of communication added by the polling mechanism is shown in Table 2. The entries (the from-to range) were computed using equation 4. Value from corresponds to the choice Of Mmin, (and the corresponding d's and c's as shown in Table 3) while to is computed for Md=0.01 (shown in Table 4). Tables 2, 3 and 4 are in Section 4.

TABLE 1

Increase in communication costs due to the polling mechanism for k = 1.5 and = 3

| k = 1.5 | W = 1 | W = 5 | W = 25 | k = 3 | W = 1 | W = 5 | W = 25 |
|---|---|---|---|---|---|---|---|
| N = 10 | 35–57% | 82–85% | NA | N = 10 | 17–22% | 57% | NA |
| N = 70 | 6–21% | 14–25% | 46–49% | N = 70 | 2–3% | 9% | 38% |
| N = 500 | 1–3% | 2–4% | 7–8% | N = 500 | 0.5% | 1% | 5% |

We observe the worst performance occurs for low N and high W. Since we assumed that the user always spends all the coins she purchased, a small number of transactions means that the amount of each transaction is high relatively to the amount of user's deposit (credit) in the bank. For k=1.5, value of N=10 is so small that $M_{min}$=40 lies beyond the range of possible threshold values M, because M≦kN=15. (Consequently, in Table 1, for N=10 and k=1.5, value to is computed not for $M_{d=0.01}$=50 but for M=15). This bound follows from the fact that M=ck, uf≦1 and m=c/f=uN. If N=m/k, the amount of each payment is maximal allowed by the corresponding value f, and hence, each payment will invoke a polling message automatically. This explains why for a small number (or high money value) of payments, the polling system is least efficient. Similarly, a large value of W causes large user-vendor registration overhead, and hence leads to worse performance. If W=N, i.e. a user makes only one purchase from each vendor, then the increase of communication costs due to the polling mechanism will be 100%, i.e., just like iKP.

It is hard to predict the values of N and W a real-life micropayment scheme might encounter, especially since we probably do not foresee all future uses of micropayments. However, the polling mechanism always gives less overhead than a fully on-line scheme, and for many patterns of usage, this overhead can be as small as 5%.

2.4 Delays Added by Polling

Since polling increases communications traffic, it will also lengthen the delay experienced by every single message. The increase of this average delay depends largely on whether the vendors are running close to their maximal throughput capability. To preserve the same performance, one would have to set up higher message-processing requirements for the vendor machines. The change would have to be roughly proportional to the traffic volume increases (as shown in table 1).

Other important delays come in if a vendor has a policy to wait with sales for an acknowledgment from a bank. This delay depends on the number of users U. number W of average user-vendor registrations per user, the communication capabilities of the bank, and the time it takes for the bank to process a single registration message. The arrival of vendor registration messages can be modeled as a Poisson process, and hence an average delay can be computed quite easily. We notice that the bank can decrease the registration-acknowledgment delay experienced by the vendors, by splitting its job into many separate servers. Instead of a single machine B. the bank can have several servers $B_1$, . . . , Bn each responsible for only 1/n fraction of the users. If the delays were caused not by the volume of traffic but by the distance between vendors and a single central polling station Bi, these separate machines (they don't need to cooperate except in user registration) can be furthermore implemented by a distributed system of servers.

A delay experienced by an honest customer due to the probability d that she will cause a false alert and will be blocked from making purchases can be best taken care of by setting d as small as possible (without increasing M, and hence, the overall traffic volume too much). We should note, though, that the actual probability that an honest user will experience such a halt is smaller than d (as given by definitions and approximations in Section 2.1). The highest possibility of unnecessary alert comes only if some user spends almost all the coins she purchased. This might not happen that often in the first place. We can furthermore imagine that the user's software will warn her when she has spent, say 85% of her deposit (credit), and would almost automatically contact the bank to purchase additional coins. Such a mechanism will decrease d even further (about twice on the average).

2.5 Guidelines for Setting up a Probabilistic Polling System

The simple guidelines for tuning the performance of this system can be stated as follows:

k controls the financial losses incurred from thieves: we have to keep it small.

The maximum expected number of polling messages from a single user is c. To reduce the processing time of the bank and the vendors and to decrease the volume of traffic introduced by the polling mechanism (and consequently the delays), we have to keep c small.

d is the probability of the costly "alerts" caused by perfectly honest users. To decrease delays, processing time and overall traffic volume, we need to keep d very small.

However, as noted in Section 2.1, these parameters are interdependent. So how shall one go about setting them up? We propose the following design loop (see the notation paragraph in Section 2.1 for reference on variables):

1. Decide on the values of m, m' and k for which it makes financial sense to run the system, taking the first estimation of value E (additional losses due to communication delays, see equation (3)) as, say, m.
2. Estimate expected values of W, N and t.
3. Using equations (1) and (2), express M and d as functions of k and c. Substitute them into equation (4) for the amount of message traffic per user, and find c which minimizes that expression. This also sets the value of M.
4. Run experiments by modeling the purchasing decisions of the customers with Poisson processes, observe the average communication delays and estimate the value of E.
5. Estimate the losses again from equation (3). If something can be improved, adjust your m, m', and k parameters accordingly and repeat from point 2.

When the system is up and running, the bank should monitor the actual values of U, W, t, N, E and d. To keep the optimal performance, the bank should adjust parameters m/m', $m_{min}$, $m_{max}$, k and c (and hence M) according to this real data, instead of relying on modeling and on estimates.

Section 3—Computations for Performance Analysis

In this section we analyze the relations between parameters in the probabilistic polling system. The reader should refer to the notation in Section 2.1 for reference about the meanings of the variables.

Let's assume for a moment that all purchases of some user have the same unit worth u. Let m=m/u, i.e. the maximal number of purchases at the unit cost u that the honest user can make. The probability of forwarding a single purchase that the vendors should use is then p=f*u=c/m u=c u/m=c/m. Let g(z) be the probability that $x_U$ becomes M at the z-th purchase of user U:

$$g(z) = \binom{z-1}{M-1} p^M (1-p)^{z-M} \quad (5)$$

Notice that $\Sigma_{z \geq M} g(z)=1$. Now we can express the probability that $x_U \geq M$ for the honest user, i.e. for the user who spent up to m of u-valued coins:

$$d = \sum_{t=M}^{m} g(z) \quad (6)$$

Approximating k

Me expected number of purchases at which the dishonest user is caught is:

$$s_u = \frac{1}{1-d} * \sum_{s>m} (z*g(z)) \quad (7)$$

(The dollar amount of spending will be $s=u*s_u$. We multiply the expectation by the 1/1−d factor because we take the expectation over only the users who make more then m transactions. Since we want only small d's, i.e. at most 1%, this factor is between 1 and 1.01. Since, $\Sigma_{z \geq M}(z*g(z))=M/p$, we approximate:

$$s_u = \frac{1}{1-d}\left(\frac{M}{p} - \sum_{z=M}^{m} z*g(z)\right) \cong \frac{M}{p} \quad (8)$$

We assume that the important parameter one will want to minimize is the proportion between the expected amount of money a thief can spend, and the amount of the thief's credit m in the bank:

$$k=s/m \quad (9)$$

which we can approximate now as:

$$k = \frac{u*s_u}{u*m} \cong \frac{M}{pm} = \frac{M}{c} \quad (10)$$

Approximating d

We derive our approximation from the summation formula above for d (equation (6). First notice that for $0 \leq I \leq m-M$:

$$\binom{m-i-1}{M-1} \leq \binom{m-M}{m-1}^i \binom{m-1}{M-1} \quad (11)$$

which leads to the following bound on d (we substitute i=m−z in the definition of d):

$$d = \sum_{i=0}^{m-M} \binom{m-i-1}{M-1} p^M (1-p)^{m-i-M} \leq \quad (12)$$

$$p^{m-M}\binom{m-1}{M-1}\frac{m-1}{p+M-pm-1}$$

Taking P=c/m and using the inequality $$\binom{n}{k} \leq \frac{1}{\sqrt{2\pi k}}\left(\frac{ne}{k}\right)^k \quad (12)$$

which holds for all k and n, we derive:

$$d_{op} \leq \frac{c^M e^{M-cI}}{\sqrt{2\pi}(M-c-1)(M-1)^{M-\frac{1}{2}}} \quad (13)$$

Comparing the direct summation and the approximation formula above, we observe that for the variable ranges that we are interested in, i.e. $k \in \{1.3, \ldots, 5\}$, $c \in \{5, \ldots 100\}$, the actual d was always no more then $0.8*d_{ap}$, as expressed in the resulting equation (2) in section 1.1.

Although we derived equation (2) by fixing the unit u (and consequently the amount m and the probability of forwarding p) of a single transaction, the values k and d, depend only on the choice of c and M, by equation (1) and (2). This is not entirely true, in the sense that the approximation (6) which led to equation (2) works best for n→∞, i.e. in our case for large m, and hence for small u. However, this inequality is sharper for smaller n, which means that the bigger the a, the smaller the proportion ad. In other words, if the user's transactions are large fractions of m (say, u/m $\geq$ ¼ c, and, hence, in $\leq$ 4 c), the probability d that an honest dealer will be halted by a false alert is much smaller then $d_{max}$, from equation (2).

Section 4—Tables

We supply the tables with the data used in the analysis of increase in communication volume (Section 2.3).

TABLE 2

| k = 1.5 | W = 1 | W = 5 | W = 25 | k = 3 | W = 1 | W = 5 | W = 25 |
|---|---|---|---|---|---|---|---|
| N = 10 | 7–11.5 | 17 | NA | N = 10 | 3.5–4.25 | 11.5 | NA |
| N = 70 | 8–29 | 20–35 | 64–68 | N = 70 | 3.5–4.5 | 12.5 | 53 |
| N = 500 | 8–29 | 20–37 | 68–77 | N = 500 | 4.5 | 12.5 | 53 |

TABLE 3

| k = 1.5 | W = 1 | | W = 5 | | W = 25 | |
| --- | --- | --- | --- | --- | --- | --- |
| | $M_{min}$ | d | $M_{min}$ | d | $M_{min}$ | d |
| N = 10 | 6 | .21 | 12 | .11 | NA | |
| N = 70 | 6 | .21 | 9 | .15 | 21 | .05 |
| N = 500 | 6 | .21 | 9 | .15 | 18 | .06 |
| N = 10 | 3 | .08 | 6 | .016 | NA | |
| N = 70 | 3 | .08 | 5 | .027 | 8 | .006 |
| N = 500 | 3 | .08 | 5 | .027 | 8 | .006 |

TABLE 4

| k | 1.5 | 2. | 3 | 5 |
| --- | --- | --- | --- | --- |
| $M_{d=0.01}$ | 40 | 15 | 7 | 4 |

REFERENCES

R. Anderson, C. Manifavas, and C. Sutherland. Netcard—a practical electronic cash system. In *Fourth Cambridge Workshop on Security Protocols*. Springer Verlag, Lecture Notes in Computer Science, April 1996. http:I/www.cl.cam.ac.uk/Users/ rjal4/.

M. Bellare, J. Garay, R. Hauser, A. Herzberg, H. Krawczyk, M. Steiner, G. Tsudik, and M. Waidner. iKPa family of secure electronic payment protocols. In *First USENIX Workshop on Electronic Commerce*, New York, 1995. http://www.zurich.ibm.com/Technology/Secur-ity/extem/ecommerce/.

S. Classman, M. Manasse, M. Abadi, P. Gauthier, and P. Sobalvarro. The millicent protocol for inexpensive electronic commerce. In *Proc. 4th International World Wide Web Conference*, 1995. http://www.research.digital.com/SRC/millicent.

R. Hauser, M. Steiner, and M. Waidner. Micro-payments based on ikp. In *14th ccc Worldwide Congress on Computer and Communications Security Protection*, C.N.I TParis—lea Defense, France, June 1996. hitp.ll www.zurich.ibm.com/Technology/Security/publications/1996/HSW96-new.ps.gz.

C. Jutla and M. Yung. Paytree: "amortized signature" for flexible micropayments. In *Second USENIX Workshop on Electronic Commerce*, November 1996.

Clifford Neuman and Gennady Medvinsky. Requirements for network payment: The netcheque perspective. In *Proc. of IEEE COMPCON*, March 1995. ftp://prospero.isi.eda/pub/papers/security/netcheque requirements-compcon95.ps.Z.

T. Pedersen. Electronic payments of small amounts. In *Fourth Cambridge Workshop on Security Pro tocols*. Springer Verlag, Lecture Notes in Computer Science, April 1996. Tech report: DAIMI PB-495, Computer Science Department, Aarhus University, August 1995.

R. Rivest and A. Shamir. Payword and micromint: Two simple micropayment schemes. In *Fourth Cambridge Workshop on Security Protocols*. Springer Verlag, Lecture Notes in Computer Science, April 1996. http://theory.Ics.mit.edaP rivestJpublications.html.

What is claimed is:

1. A network-based method for monitoring electronic transactions between a customer and vendors comprising steps performed at a trusted party:

receiving messages on said network from each of one or more vendors, a first message from each vendor registering said customer as a customer of the respective vendor, adding each vendor from whom a first message has been received to a list of vendors, receiving additional messages from one or more of said vendors on said list, each said additional message reflecting a transaction between said customer and an originating vendor originating said additional message, said additional message being originated with a probability based on transaction conditions determined at said originating vendor, and selectively sending messages on said network to said vendors on said list regarding at least one transaction involving said customer.

2. The method of claim 1 wherein a message sent to a vendor indicates non-approval of a transaction.

3. The method of claim 1 further comprising increasing a stored count of the number of messages received from one or more vendors regarding transactions between said customer and at least one vendor on said list of vendors.

4. The method of claim 3 wherein a message sent to a vendor indicates non-approval of a transaction based on said stored count exceeding a threshold determined by said trusted party.

5. The method of claim 1 wherein said transaction conditions comprise the value of each said transaction between said customer and said originating vendor.

6. The method of claim 1 wherein said transaction conditions comprise a nominal cumulative transaction value associated with said customer and an amount by which said cumulative transaction value may be exceeded.

7. The method of claim 6 wherein said nominal cumulative transaction value is a credit limit.

8. The method of claim 7 wherein said nominal cumulative transaction value is the amount of a deposit made by said customer.

9. The method of claim 1 wherein said trusted party is a bank.

10. The method of claim 1 wherein said messages from said trusted party to at least one vendor on said list comprises non-approval for at least one transaction between said customer and said at least one vendor.

11. The method of claim 10 wherein said messages from said trusted party are sent to all vendors on said list.

12. A network-based method for monitoring electronic transactions between a customer and vendors comprising steps performed at a trusted party:

receiving messages on said network from each of one or more vendors, a first message from each said vendor registering a first transaction between said customer and the respective vendor, adding each vendor from whom a first message has been received to a list of vendors, receiving additional messages from one or more of said vendors on said list, each said additional message from a vendor reflecting a transaction subsequent to said first transaction between said customer and an originating vendor originating said additional message, said additional messages being originated for less than all transactions between said customer and said originating vendor, said additional messages being originated in accordance with a deterministic relationship based on the number of transactions between said customer and said originating vendor, and selectively sending messages to said vendors on said list regarding said customer's transactions.

13. The method of claim 12 wherein the ith transaction between a customer and said originating vendor gives rise to an additional message if and only if i=[$k^j$], for an integer j.

14. The method of claim 13 wherein k=2.

15. The method of claim 12 wherein each said additional message contains information concerning the cumulative amount of all transactions between said customer and said originating vendor since the immediately preceding message from said originating vendor to said trusted party regarding transactions between said customer and said originating party.

16. A network-based method for monitoring electronic transactions between a customer and vendors on said network comprising steps performed at at least some vendors, said method comprising, for a particular vendor, the steps of:

commencing a transaction with said customer in which an electronic payment is offered by said customer, when said transaction is a first transaction between said customer and said particular vendor, sending a message on said network to a trusted party identifying the customer and the transaction, sending additional messages on said network to said trusted party upon the occurrence of less than all of any subsequent transactions between said customer and said particular vendor, any said additional messages for particular transactions being sent with a probability based on a determination of transaction conditions attending respective ones of said transactions, receiving messages from said network relating to transactions between said particular vendor and said customer from said trusted party.

17. The method of claim 16 wherein said transaction conditions comprise the value of said transactions.

18. A network-based method for monitoring electronic transactions between a customer and vendors on said network comprising steps performed at at least some vendors, said method comprising, for a particular vendor, the steps of:

counting the number of transactions involving said particular vendor and said customer, sending messages on said network to a trusted party for less than all of any transactions between said customer and said particular vendor, said sending of a message occurring when there have been a deterministic number of transactions between said customer and said particular vendor since the most recent message relating to transactions between said customer and said particular vendor was sent to said trusted party, receiving messages from said network relating to transactions between said particular vendor and said customer from said trusted party, and completing the transaction that triggered a message to said trusted party when a message from said network authorizes said transaction that triggered said message to said trusted party.

19. The method of claim 18 wherein the ith transaction between a customer and said particular vendor gives rise to a message if and only if $i=[k^j]$, for an integer j.

20. The method of claim 18 wherein said trusted party is a bank.

* * * * *